United States Patent [19]
Katsukura et al.

[11] 3,886,350
[45] May 27, 1975

[54] LIGHT PROJECTOR APPARATUS FOR CONTROLLING PROFILE OF LIGHT PROJECTION

[76] Inventors: Kiichiro Katsukura; Kazuyoshi Katsukura, both of 14-4, 2-chome, Kamata, Ota-ku, Tokyo; Taiji Sato, 3048 Hirakata, Koshigaya, all of Japan

[22] Filed: June 29, 1973

[21] Appl. No.: 375,157

[30] Foreign Application Priority Data
July 7, 1972  Japan.............................. 47-67580

[52] U.S. Cl. .................. 240/44.2; 240/24; 240/49; 240/61.7; 340/50
[51] Int. Cl. ........................................... F21v 19/02
[58] Field of Search ........ 240/10.1, 41.6, 49, 61.05, 240/61, 61.7, 24, 44.2; 340/50

[56] References Cited
UNITED STATES PATENTS
| | | | |
|---|---|---|---|
| 2,578,239 | 12/1951 | Gosswiller | 340/50 |
| 2,814,029 | 11/1957 | McRea | 240/49 X |
| 3,117,302 | 1/1964 | Cardarelli et al. | 340/50 |
| 3,764,799 | 10/1973 | Schulz | 240/24 |

*Primary Examiner*—Richard L. Moses
*Attorney, Agent, or Firm*—Kane, Dalsimer, Kane, Sullivan and Kurucz

[57] ABSTRACT

A light projector apparatus comprising a light reflecting surface, an electric lamp and a rotating means of the lamp. The electric lamp has a light emission source inside, whose shape as viewed from the light axis varies with the rotation of the source by the rotating means. The light source located with different angles to the light axis causes different profiles of projection. Thus this apparatus provides a completely different function from the conventional ones, for controlling light distribution.

5 Claims, 8 Drawing Figures

LIGHT PROJECTOR APPARATUS FOR CONTROLLING PROFILE OF LIGHT PROJECTION

BACKGROUND OF THE INVENTION

The present invention relates to a light projector apparatus, and particularly to a light projector wherein light distribution can be controlled by rotating a light source.

It is now widely practiced to control profile of light projection through reflection and/or refraction on the surface of a projector. For the reflection purpose, rotating parabolic surfaces are often used for projectors. The advantage of the use of the rotating parabolic surfaces for projectors resides in that it enables the projector to produce light beam without any appreciable decrease in illumination intensity along the light axis. The projection of this type may be realised by locating or positioning a point source of light on the focus point of the parabolic reflector surface. If the source of light is located at the focus point, all the reflected rays from the surface go parallel with the axis; accordingly the illumination intensity along the axis will remain substantially the same. However, this type of projection has disadvantages as well. In the presence of atmosphere, reflected rays are necessarily absorbed or diffused by atmosphere. Purely cylindrical configuration in section of light projection is also spoiled by the length of the light source which is often too great to produce prefectly parallel rays with the axis. Thus the illumination of distant area is liable to be weakened.

With the described conventional projectors using rotating parabolic reflectors, light distribution may be controlled in the following manners. The light source is moved before or behind of the focus point to control the light distribution. If the light source which is movably situated in the proximity of the focus point along the light axis, is continuously moved toward the reflector surface, the light beam becomes broadened. In this case, if at least a portion of the light source remains at the focus point, illumination intensity along the light axis is maximum. When the light source is deviated from the focus point completely, illumination intensity will show a sudden decrease, and will become very low at a certain area when the light source is further moved toward the surface. On the contrary, if the light source is outside the focus point i.e., opposite to the reflection surface. The reflected rays of light will be concentrated at a certain point on the light axis. Thus, by changing the position of the light source in respect to the reflector, light distribution may be controlled.

In addition to the above described operation, the control of the projection may be achieved by the use of the modification of the reflecting surface, or using matted, corrugated or point-cut glass instead of smooth materials for the reflecting surfaces. However, the use of various surfaces for the controlling means will cause a great trouble and in reality it requires time consuming labour. Each time different profile of light projection is desired, corresponding surface has to be attached in place.

SUMMARY OF THE INVENTION

A primary object of the present invention is to provide a projector in which foresaid drawbacks are eliminated. The basic principle of the present invention is that rays, emitted by the light source situated at the focus point and reflected from the parabolic surface, will form a light beam of which cross section has a similar shape to that of the source, as viewed along the axis. In other words, if an illuminant is rotatably situated at the focus point, profile of projection may be varied depending on the degrees of the rotation of the illuminant or light emitting filament. In case the illuminant is of a spherical shape, and accordingly the illuminant always appears the same to the centre of the surface, and then the light beam may not be varied even if the illuminant is rotated. However, if an illuminant has a parallel piped, cylindrical form or other similar shape, control of the profile may be achieved with the rotation of the illuminant or light emitting means. Moreover, since the illuminant is located on the focus point, maximum illumination will always be available.

BRIEF DESCRIPTION OF THE DRAWINGS

Now a preferred embodiment of the present invention will be described in accordance with the accompanying drawings, in which.

DESCRIPTION OF THE PREFERRED EMBODIMENTS

Figure 1:
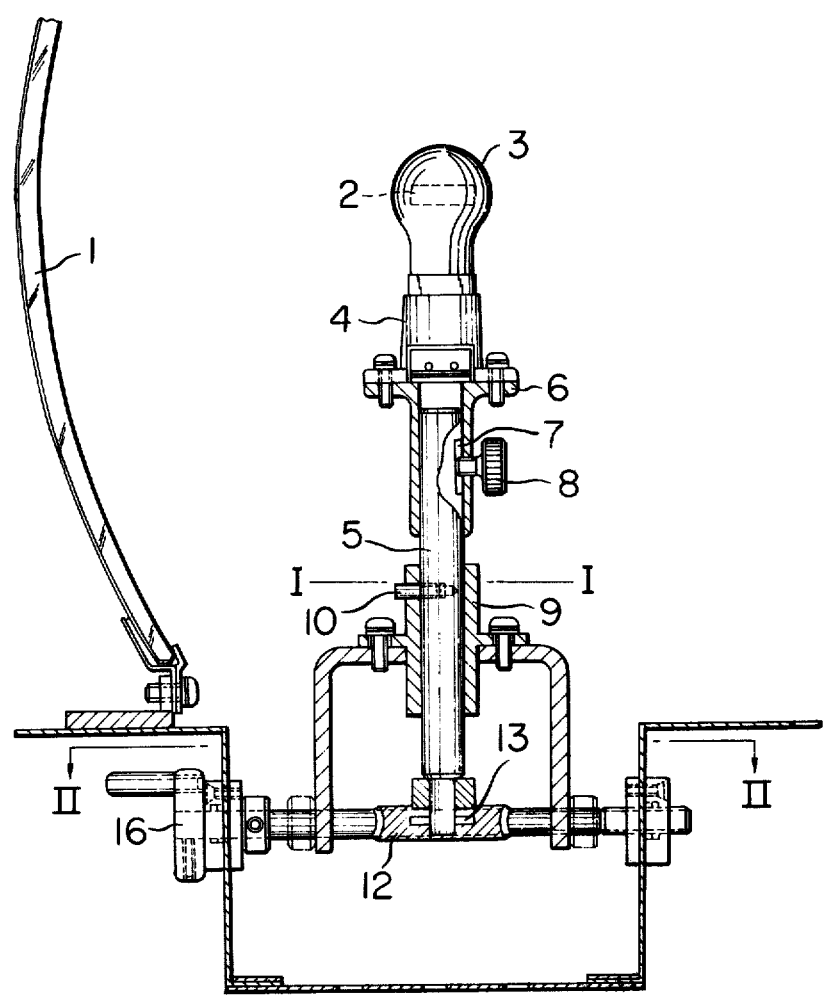
FIG. 1 is an elevational view of a reflecting search light apparatus according to the present invention partially shown in section.

Referring to FIG. 1, disposed in the proximity of the focus point of the parabolic surface 1 is a lamp 3 which contains a light emission source 2, which is made of long thin shaped tungsten coil filament having a circular section. In the operating state of the lamp shown in FIG. 1, the said source is placed in a manner that the longitudinal sides thereof is parallel to the light axis of the reflecting surface 1. Lamp 3 is mounted on the top of the rotating shaft 5 by means of a lamp receptacle 4. The light emission source or illuminant 2 may be situated in the proximity of the focus point of the parabolic surface 1. Between lamp receptacle 4 and the rotating shaft 5, L-shaped or forked supporting member may be employed in place of lamp receptacle supporting member 6.

The lamp receptacle 4 is fixed to the rotating shaft 5 with a thumb screw 8 at a lower portion of the said receptacle supporting member 6 in a manner that the said screw 8 pressingly bear against the shaft 5 at the bottom of the hole 8, so that the receptacle 4 is secured to the shaft 5. The position of the lamp 3 may be readily adjusted if the thumb screw 8 is loosened.

The rotating shaft 5 is supported by a supporting sleeve member 9 at the middle portion of the said shaft, so as to assure proper rotation of said shaft.

Figure 3:
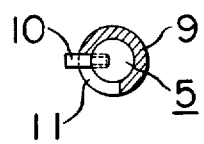
FIG. 3 is a cross sectional view of the rotating shaft taken along I—I in FIG. 1, FIGS. 4, 5, 6, and 7 show various patterns of light produced by the various embodiments of the present invention.

A pin 10 protrudes from the rotating shaft 5 through the slot 11 formed in the supporting means 9 (FIG. 3). Since the pin 10 is fixed to the said shaft 5, the pin is rotated together with the shaft 5. Therefore, the rotathe length of the slot 10 and the diameter of the pin 10.

Below the rotating shaft 5, there is provided a worm gearing box for transmitting the driving power from the shaft 15 to the rotating shaft 5 through a worm 14 and a worm wheel 12 which is connected to the rotating shaft 5 with a pin 13.

Figure 2:
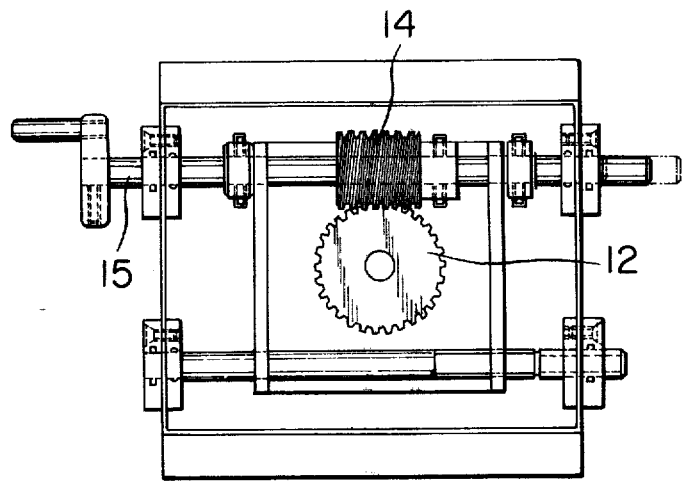
FIG. 2 is a cross section of the apparatus taken along II—II in FIG. 1 to show the gearing box of the present invention.

If the worm 14 (shown in FIG. 2) is rotated by the driving wheel 15, the adjoining worm wheel 12 rotates to turn the shaft 5. As a consequence, lamp 3 on the top of the shaft 5 rotates about the axis which extends through the central point of the light emission source 2. In this case the rotation of the lamp is limited to the extent determined by the pin 10 and the slot 11, as mentioned before.

With the continuation of such operation as described above, light profile may be continuously controlled until a desirable profile is obtained. Light profile thus attained always represents a similar shape to that of the light emission source 2 as viewed from the light axis of the apparatus, as hereinafter described.

An electric motor may be optionally provided to drive the shaft 15 in place of manually operational wheel.

Although the description of the present invention has been made on the rotatable light source, it does not exclude the use of conventional method of light distribution control, at all. With the combinating use of rotation and sliding of the light emission source, more variations of light profile may be obtained.

Figure 4:
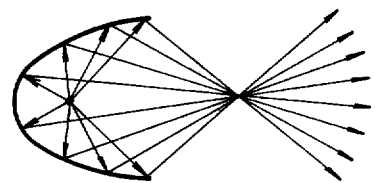

Parabolic reflector described in relation to the present invention may be replaced by other surfaces such as elliptical surface, spherical surface, or flat surface. In FIG. 4, an elliptical surface is used, where the light source is at the first focus point of the said surface. Being reflected on the surface, lights from the light source will be focused at the second focus point of the said elliptical surface, as shown in FIG. 4. By rotating the light source, focusing may be blurred or sharpened in this embodiment.

Figure 5:
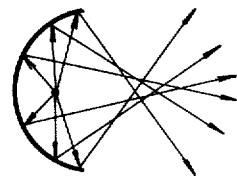
Figure 6:
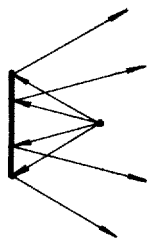

FIG. 5 shows a use of spherical surface. FIG. 6 shows a use of flat surface. In both embodiments, projection pattern (shown in arrows) may be loosened or tightened.

Figure 7:
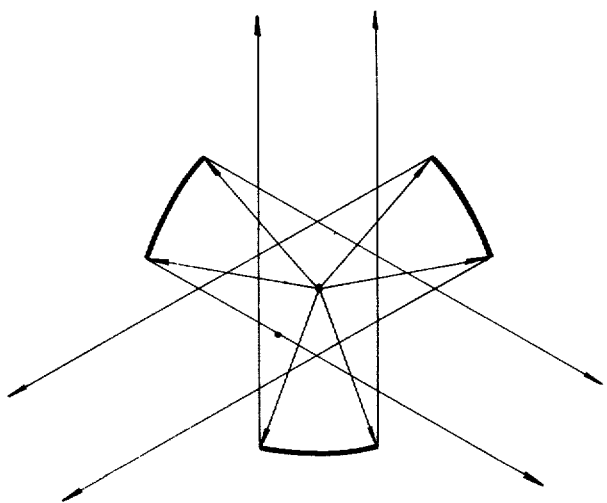

FIG. 7 shows another embodiment in which three pieces of reflecting surface are used. Light beams are obtained in three directions in this embodiment. Thus a plurarity of surfaces may be used for further variations of light beam.

Figure 8:
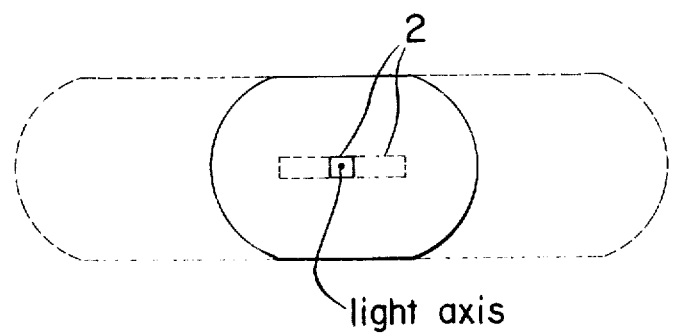
FIG. 8 is a cross sectional profile of light projection.

FIG. 8 shows two light profiles produced by the present apparatus. The profile shown in dotted line is obtained when the light emission source 2 is in the dotted position where longitudinal sides of the said source are perpendicular to the light axis. The profile in solid line is realised when the longitudinal sides of the said source are parallel to the light axis.

As is apparent from this drawing, the present method of light distribution control is considerably convenient especially to search lights for marine uses. When one is searching something on the sea, and when it is desired to see more clearly around a certain illuminated area, it is sufficient only to rotate the light source, to get an extended illumination, with this apparatus.

While salient features have been illustrated and described with respect to particular embodiments, it should be readily apparent that modifications can be made within the spirit and scope of the invention, and it is therefore not desired to limit the invention to the exact details shown and described.

What is claimed is:

1. A light projector apparatus comprising: a reflector, an electric lamp having a light source within the bulb thereof and located at or near the focus point of the reflector, a rotating means for the electric lamp, the light source being an elongated luminous body rotatable between fixed positions transversely and longitudinally with respect to the surface of the reflector thereby obtaining a different profile of light emission when said rotating means is actuated and the light source is rotated to a new fixed position, and means for fixing the position of the light source with respect to the reflector at a plurality of different positions between the longitudinal and transverse positions.

2. A light projector apparatus in accordance with claim 1 wherein the reflector has a parabolic shape.

3. A light projector apparatus in accordance with claim 1 wherein the reflector has an elliptical shape.

4. A light projector apparatus in accordance with claim 1 wherein the reflector has a flat shaped surface.

5. A light projector apparatus in accordance with claim 1 wherein the rotating means includes an electric motor.

* * * * *